US007865391B2

(12) United States Patent
Martinez-Olagüe et al.

(10) Patent No.: US 7,865,391 B2
(45) Date of Patent: Jan. 4, 2011

(54) AUTOMATIC ROAD CHARGING SYSTEM BASED ONLY ON SATELLITE NAVIGATION WITH GUARANTEED PERFORMANCE AND METHOD FOR ITS ANALYSIS AND DESIGN

(75) Inventors: Miguel Angel Martinez-Olagüe, Madrid (ES); Joaquin Cosmen-Schortmann, Madrid (ES)

(73) Assignee: GMV, S.A., Madrid (ES)

( * ) Notice: Subject to any disclaimer, the term of this patent is extended or adjusted under 35 U.S.C. 154(b) by 305 days.

(21) Appl. No.: 11/655,047

(22) Filed: Jan. 18, 2007

(65) Prior Publication Data

US 2007/0216364 A1 Sep. 20, 2007

(30) Foreign Application Priority Data

Jan. 18, 2006 (EP) .................................. 06380013

(51) Int. Cl.
*G07B 15/02* (2006.01)
*G05D 3/00* (2006.01)

(52) U.S. Cl. ............................ 705/13; 701/13; 235/384

(58) Field of Classification Search ................... 705/13; 701/13; 235/384

See application file for complete search history.

(56) References Cited

U.S. PATENT DOCUMENTS

| | | | | |
|---|---|---|---|---|
| 6,705,521 | B1 * | 3/2004 | Wu et al. | 235/384 |
| 6,847,893 | B1 * | 1/2005 | Lupash | 701/213 |
| 7,181,414 | B1 * | 2/2007 | Ogawa et al. | 705/13 |
| 2002/0049630 | A1 * | 4/2002 | Furuta et al. | 705/13 |
| 2002/0116098 | A1 * | 8/2002 | Maynard | 701/13 |
| 2003/0115095 | A1 * | 6/2003 | Yamauchi | 705/13 |
| 2003/0189498 | A1 * | 10/2003 | Kakihara et al. | 340/928 |
| 2006/0047413 | A1 | 3/2006 | Lopez et al. | |
| 2006/0129315 | A1 * | 6/2006 | Kanematsu | 701/210 |
| 2007/0192177 | A1 * | 8/2007 | Robinson et al. | 705/13 |

FOREIGN PATENT DOCUMENTS

| | | |
|---|---|---|
| WO | 02/101661 | 12/2002 |

OTHER PUBLICATIONS

Townsend, Mark, "Pounds 1.30 a mile tolls next for drivers: Success of London traffic charges pave way for trial of satellite tracking system to bill car users for their journey", Feb. 23, 2003, The Observer, p. 2.*

SC-159 of RTCA "Minimum Operational Performance Standards for Global Positioning System/Wide Area Augmentation System Airborne Equipment", RTCA, Section 1.7.2 (pp. 12 and 13) and Appendix J (J-1 and J-2), Nov. 28, 2001.

David J. Sheskin, *Handbook of Parametric and Nonparametric Statistical Procedures*, Chapman & Hall/CRC, p. 291, Fourth Edition, 2007.

* cited by examiner

*Primary Examiner*—Fadey S Jabr
(74) *Attorney, Agent, or Firm*—Ladas & Parry LLP

(57) ABSTRACT

An automatic charging system for charging a vehicle for using an infrastructure delimited by a boundary during a charging period Tc based on Global Navigation Satellite Systems (GNSS) location with guaranteed performance. The system includes an onboard receiver with integrity guarantee which, in addition to providing position information, provides additional information relating to the error that can be expected in the position consisting of a health flag (denoting a Healthy/Unhealthy status), and a Radial Protection Level (RPL) relating to the amount limiting the horizontal position error according to one direction and with a probability equal to a known value $I_{Rx}$.

9 Claims, 7 Drawing Sheets

AUTOMATIC ROAD CHARGING SYSTEM BASED ONLY ON SATELLITE NAVIGATION WITH GUARANTEED PERFORMANCE AND METHOD FOR ITS ANALYSIS AND DESIGN

FIELD OF THE INVENTION

The present invention belongs to the field of Global Navigation Satellite Systems (GNSS) applicable to ground transportation and specifically to what is commonly known as Road Charging, Road Pricing, Road User Charging (RUC), Virtual Tolling or Electronic Fee Collection (EFC), i.e. automatic road charging systems. The term road charging will be used throughout the present application.

The present invention can be applied for different purposes within this field: automatic toll expressways or highways, charge for accessing urban perimeters, charge for parking in delimited areas, urban congestion control, etc., and generally to those applications in which it is necessary to have guaranteed information that a vehicle has used or accessed a given transportation infrastructure.

BACKGROUND OF THE INVENTION

The idea of using vehicle position information obtained by means of a GNSS navigation satellite system to determine a toll amount is well known and in fact already applied operationally in some systems, although in combination with other technologies differing from GNSS. The basic concept consists of using vehicle P-T (position, time) data along with the geographic information of an infrastructure subject to charge so as to determine, given a toll rule or criterion, whether or not the vehicle has used the infrastructure, and if it has, the toll amount to be charged. Its implementation requires an onboard device or OBU (onboard unit) including a GNSS receiver providing P-T data, and mobile equipment for data communication with a processing center.

In a generic manner, the infrastructure subject to charge can be a specific transportation road: highway, expressway or street, transportation roads within an area, a parking garage, etc. The charging criterion may also be a "fixed amount" type, i.e. a given amount is charged for road usage or for entering a geographic area delimited by a perimetral boundary within an established time period; or it can be a "variable amount" type, i.e. an amount is charged depending on the "amount" of usage that is made of said infrastructure. The "amount" of usage can be measured according to occupancy time in the infrastructure or according to the distance traveled therein.

In the "fixed amount" case, P-T data from the receiver is used to detect (yes/no) whether or not the vehicle has used the infrastructure subject to charge in the charging period established in the criterion.

The advantages of this concept or idea are undoubtedly enormous. On one hand, applying charges to any infrastructure does not require deploying costly equipment in roads and, yet even more interesting, the system is totally flexible when defining what is charged and how it is charged. It is therefore possible, for example, to implement a perimetral charging system for accessing large cities or to charge for the time parked in said perimeter, in the latter case eliminating traditional parking meters. In the case of highways and expressways the system provides the possibility of charging according to usage (kilometers or any desired combination of the distance traveled, time used, trajectory speed, stops, etc.) thereof without needing to install any toll infrastructure.

That is, the GNSS-based road charging system determines whether or not the infrastructure has been used and, therefore, whether or not an amount is to be demanded from the carrier of the onboard receiver or OBU; to that end there are two essential parameters relating to the road charging system:

- Charging availability: Probability that a vehicle that has indeed used the infrastructure within the charging period is detected by the system and, therefore, charged. This parameter is essential so that it is acceptable to the public or private infrastructure operator.
- Probability of mischarging: Probability that a vehicle carrying the onboard receiver or OBU who has not used the infrastructure during the charging period is wrongfully detected by the system and, therefore, mistakenly charged. This parameter is essential for potential users and for system credibility and viability, because:
- on one hand it allows having prior guarantees that allow confronting refusal or wrongful claims from users who have used the infrastructure but refuse to pay; and,
- on the other hand it allows limiting the number of justified claims from non-users who where mistakenly charged.

Current GPS-based systems cannot guarantee minimum performance of the probability of mischarging parameter given that GPS-based position errors are not delimited, nor is the type of distribution known. It is important to stress that although GPS-based position precision is currently high, it does not assure that huge errors will not occur from time to time, and these errors could be translated into a mischarging. This means that someday when the number of vehicles equipped with an OBU increases and complexity of the network of highways in which road charging is applied becomes more complex (for example with neighboring highways having different rates), the number of mischarges will substantially increase.

However, as will be seen in the description of the present invention, the invention does allow delimiting the probability of mischarging parameter. To that end the present invention is based on the use of a GNSS receiver with guaranteed integrity such as, for example, the one defined and disclosed in European patent application EP 05076289.7, entitled "Method and System for Providing GNSS Navigation Position Solution with Guaranteed Integrity in Non-Controlled Environments". In addition to providing position and time information, said onboard receiver/OBU with integrity guarantee provides the following additional data output:

- A health flag (healthy/unhealthy). When the flag is healthy the position solution error in any one direction has an upper limit for this measurement that is an RPL (Radial Protection Level) amount with a probability equal to a known value called integrity of the position solution provided by the receiver $I_{RX}$.
- An RPL (Radial Protection Level), i.e. the amount which limits the error in the horizontal position according to a direction with a probability equal to $I_{Rx}$, i.e.:

$$P(|\vec{\epsilon}\cdot\vec{u}|>\text{RPL})=1-I_{RX} \tag{1}$$

wherein $\vec{\epsilon}$ is the position error vector and $\vec{u}$ is any unit vector.

It is important to note that RPL and HPL (Horizontal Protection Level), commonly known in civil aviation, are not exactly the same. HPL is the upper limit of the error modulus, whereas RPL is the upper limit in a specific direction. On the other hand, HPL is associated to an $I_{Rx}$ probability value measured during a certain time period including several measurements, whereas RPL is defined for probability $I_{Rx}$ associated to a single measurement.

DESCRIPTION OF THE INVENTION

The invention relates to an automatic charging system for charging a vehicle for usage of a road based on GNSS location with guaranteed performance according to claim 1, and to a method for the analysis and design of such a system according to claim 12. Preferred embodiments of the system and of the method are defined in the dependent claims.

Within the context of road charging systems, the system and method of the present invention introduce an essential novelty feature as they allow guaranteeing the charging system performance a priori, and in particular they allow delimiting (lower and upper limits, respectively) essential system performance parameters indicated hereinbefore: charging availability and probability of mischarging.

In fact, said probability of mischarging parameter is closely related to the integrity performance of the onboard receiver with integrity guarantee of the system, and it is not possible to delimit it with no knowledge of said receiver integrity performance.

A first aspect of the present invention relates to an automatic charging system for charging a vehicle i for usage of an infrastructure delimited by a boundary during a charging period Tc based on GNSS location with guaranteed performance, comprising:

- an onboard receiver with integrity guarantee or OBU in said vehicle which in addition to providing position information, provides additional information relating to the error that can be expected in said position, consisting of:
  - a health flag (healthy/unhealthy), when the flag is healthy, the position solution error in any one direction has an upper limit that is the RPL amount with a probability equal to a known value ($I_{RX}$), and
  - an RPL or Radial Protection Level, i.e. the amount delimiting the horizontal position error according to one direction, with a probability equal to a known value $I_{RX}$, i.e.:

$$P(|\vec{\epsilon}\cdot\vec{u}|>\mathrm{RPL})=1-I_{RX}$$

where $\vec{u}$ is any unit vector.

The system further comprises:

- a detection module determining that the vehicle is within the boundary when all the delimited points of a region comprised by a circle of radius RPL centered on said position are within the boundary, and
- a charging module using the result of the detection module to determine if the vehicle has used the road during said charging period Tc.

The automatic charging system preferably uses a charging module determining that the vehicle has used the road during said charging period Tc when there is a predefined number K of positions for which the detection module has determined that the vehicle is within the boundary, i.e. for all K positions a region comprised by a circle of radius RPL centered on each one of them is within the boundary during Tc, and wherein the value of K is chosen so as to assure that the probability of mischarging, i.e. the probability that the vehicle carrying the onboard receiver that has not been within the boundary during the charging period is charged, is delimited, the relationship between K and said probability of mischarging being given by the following expression:

$$Pmd_i \le \sum_{k=K}^{M} \binom{M}{k} (1-I_{Rx})^k \cdot (I_{Rx})^{M-k}$$

wherein M is the total number of independent samples taken from the onboard receiver in the vehicle i during the entire charging period Tc.

That is, the selection of the number of required positions K provides a degree of freedom in system design which allows guaranteeing the value of the probability of mischarging. This parameter K also affects charging availability such that higher values of K decrease the probability of mischarging and lower values of K improve the charging availability.

Therefore the system of the invention uses the data provided by the onboard receiver with integrity guarantee, such that it is possible to guarantee a certain minimum performance in the road usage charging system, i.e. delimiting the performance in terms of charging availability and probability of mischarging.

Said onboard receiver or OBU is an onboard receiver with guarantee, preferably implementing the guaranteed integrity method and system disclosed in European patent application EP 05076289.

The automatic charging system of the invention can be a perimetral charging system, in such case said boundary being delimited by the points of all the access roads to the charging area, after which the vehicle user is notified that it is subject to charge.

It may also be an automatic road usage charging system and said boundary would be defined such that it contains said road and does not contain any other road or area allowing the vehicle passage or occupancy, such that it guarantees that a vehicle is a user if and only if it is within the boundary.

It may be an automatic charging system for usage of a distance of the road, said stretch being calculated based on the sum of lengths of road sections into which the road can be divided such that each section has no entrance or exit other than its own ends.

The direction in which the vehicle has traveled on the road should preferably be determined in order to charge the vehicle, checking that there are at least two positions the sequence of which over time defines the traveling direction, and that they comply with the idea that the regions defined by a circle of radius RPL centered on these positions do not intersect.

The system also envisages the possibility that the charge depends on the number of times the vehicle enters the infrastructure, in which case the probability of mischarging, i.e. the probability of charging for more times than the vehicle has actually entered the infrastructure, is also delimited.

The charge can be calculated in the OBU with data on the boundary sent from a control center.

For different vehicles equipped with OBUs, the charge can also be calculated in a control center with position data, RPLs and health flags sent from each OBU.

The charge can also be a function of other known parameters characteristic of the vehicle (such as the vehicle type and weight) or of the charging period (time slot, day of the week or year, etc.)

The system preferably includes a module in the OBU which implements an algorithm identifying the optimal moment in which the sample is obtained (position, speed, RPL and health flag), for a time equal to the sampling period, the optimal moment being the moment the sample of which has minimal RPL within the set of measurements with the health flag declared as healthy, and in which the sampling period value is selected as a value that is:

greater than the sampling period of the receiver (typically 1 second), greater than the measurement correlation time, such that it is guaranteed that the sample errors are not correlated, and less than a given value guaranteeing an overall charging availability level.

A second aspect of the present invention relates to a method of analysis and design of a system of charging a vehicle, or road charging, having guaranteed performance as has been hereinbefore defined, in which given certain performance requirements—probability of mischarging and charging availability—of said charging system and certain performance of the onboard receiver with integrity guarantee, the geometry of the infrastructure object of charge is defined. Or the method of analysis and design also allows analyzing, designing and anticipating the road charging system performance from the geometry of the infrastructure subject to charge, the performance of the GNSS onboard receiver with integrity guarantee and the charging criterion.

According to the invention, the method of analysis and design of a vehicle perimetral charging system, or perimetral road charging system with guaranteed performance as said perimetral system is defined hereinbefore, comprises the following steps:

obtaining a GNSS performance map ($D_{RX}$, $I_{RX}$, RPL), determining for each point within the boundary and for each sampling moment the probability of having a position tagged as healthy by the receiver ($D_{Rx}=D_{Rx}(\overrightarrow{Rr}_i(t^I_j),t^I_j)$), as well as the expected RPL values associated to its position measurements for a certain given integrity value $I_{RX}$, according to GNSS onboard receiver performance and GNSS visibility conditions;

obtaining a charging availability map associated to each point within the boundary and to each sampling moment ($p_j$), calculating for each point within the boundary and to each sampling moment the probability that a vehicle located at said point in that moment generates a healthy position sample and that it is detected by the system detection module, for which it uses the GNSS performance map together with the following expression of r on each point within the boundary:

$$p_j = D_{Rxj} \cdot r_j$$

wherein:

$D_{Rxj}=D_{Rx}(\overrightarrow{Rr}_i(t^I_j),t^I_j)$ is the GNSS position availability ($D_{RX}$) at a given point and moment as it was obtained in the previous step; and $r_j=r_j(z_{rj})$: is the probability that a circle of radius RPLij centered on $\overrightarrow{R}_{mi}^{H}(t_j)$ is within the boundary, this being a function only of the distance of the point to the boundary ($z_{rj}$) and of the expected RPL value at that point;

creating a universe of possible trajectories ($Tr_i$) according to the real traffic data available for the infrastructure, each trajectory being defined by a sequence of horizontal position vectors that the vehicle defines in said infrastructure and by the frequency of occurrence data thereof ($fr_i$);

determining the charging availability for each trajectory ($Pd_i$), determining the charging availability for each trajectory $Tr_i$ by means of a formulation that is a function only of the amount of points K that the system charging means requires, of the charging availability at each point of the trajectory, of the decorrelation time of the error for the positions obtained by the GNSS receiver, of GNSS availability, of the length of the trajectory that is within the perimeter and of the speed of the vehicle along the trajectory;

determining the average charging availability from $Pd_i$ and the frequency of occurrence of each trajectory fri as:

$$\text{Charging availability(Average)} = \Sigma Pd_i \cdot fr_i$$

determining the probability of mischarging as:

$$Pmd_i = \sum_{k=K}^{M} \binom{M}{k} (1 - I_{Rx})^k \cdot (I_{Rx})^{M-k}$$

wherein M is the total of samples that can be generated by the onboard receiver during the entire charging period Tc; and checking if the road charging system performance is compatible with the existing system performance requirements, and if it is not, checking if it is possible to comply with said requirements by modifying K.

Increasing the value of K allows, for the same value of $I_{RX}$, reducing the probability of mischarging at the expense of decreasing the charging availability. On the other hand, decreasing K improves the charging availability at the expense of worsening the probability of mischarging.

According to another preferred embodiment of the invention the method of analysis and design of a vehicle road charging system with guaranteed performance as said system is defined hereinbefore allows for a given road section characterized by its geometry, particularly length L and distance d between the edge of the road and the boundary, and the geometry of its surroundings, analyzing system performance in terms of charging availability and probability of mischarging as a function of the number of positions K required by the charging module, wherein the calculation of the charging availability is done using a conservative approximation based on the following hypotheses:

the vehicle is always within the road on which the vehicles are circulating and at the outer edge of the road;

the distance form the road to the boundary is "d", characteristic of the infrastructure and which is considered constant in the section;

the position errors for probabilities of the order of magnitude of the availability can be limited in a conservative manner by a zero-mean Gaussian distribution and with a standard deviation calculated as RPL/F, where F is the factor associated to the probability $I_{RX}$ of the Gaussian distribution, where the calculation process is as follows:

the upper allowable limit for the probability of mischarging for a vehicle not using the road is determined from the number of vehicles that stay off the road (Np) and from a desired requirement for the probability of mischarging of MD or more vehicles throughout the charging period Tc (PMD) by means of:

$$PMD = \sum_{md=MD}^{NP} \binom{Np}{md} Pmd^{md} \cdot (1 - Pmd)^{Np-md}$$

the number of points K of the system detection module guaranteeing the required Pmd is determined with the obtained Pmd value and given certain integrity ($I_{Rx}$) performance of the onboard receiver by means of the expression:

$$Pmd_i = \sum_{k=K}^{M} \binom{M}{k} (1 - I_{Rx})^k \cdot (I_{Rx})^{M-k}$$

the family of curves such as that in the graph in FIG. 6 is constructed with the resulting K value, and given the $I_{Rx}$ and RPL values for the onboard receiver and a certain signal reception scenario, by means of the expression of Pdi:

$$Pd_i \geq \left[ \sum_{k=K}^{M} \binom{m}{k} (D_{RX} \cdot r)^k \cdot (1 - D_{RX} \cdot r)^{m-k} \right]$$

with $$r = 1 - I_{Rx};\ (d = 0)$$

$$r = P\left(N(0, 1) < F \cdot \left(\frac{d}{RPL} - 1\right)\right);\ (0 < d < 2RPL)$$

$$r = I_{Rx};\ (d \geq 2RPL)$$

the number of points (m) required for guaranteeing the required charging availability is obtained from said family of curves; and given a length L of the road section, a speed V of the vehicle and a decorrelation time between measurements $\tau_c$, the number of available position samples $L/(V \cdot \tau_c)$ within the boundary is checked as to whether it is equal to or greater than the number of necessary samples m resulting from the previous step; and if this is not the case, it means that it is not possible to simultaneously comply with the probability of mischarging and charging availability requirements for the given scenario for any value of K.

This method of analysis and design of a road charging system allows identifying the road sections which comply with specified charging availability and probability of mischarging requirements.

Preferably the value of RPL is modeled as a known function of $I_{RX}$ according to the features of the receiver, and the tool allows determining $I_{RX}$ of the receiver complying with said requirements for a given road section characterized by its geometry, particularly length L and distance d between the edge of the road and the boundary, and the geometry of its surroundings, and given certain charging availability and probability of mischarging requirements.

The method of analysis of the invention allows relating the road charging system performance with the data from the scenario in question and the receiver performance, such that different types of analysis associated to the road charging system object of the invention can be carried out:

System design: adjusting the design parameters of the road charging system or suitably selecting the parameters defining the geometry of the infrastructure object of charge, such that the charging availability and probability of mischarging performance defined by the infrastructure provider (a city council, a highway concessionaire, the State, etc.) are met.

Anticipation of features: anticipating what the charging performance of the system will be before it begins operating and, therefore, seeing if the established requirements will or will not be met without needing to perform costly tests to accumulate statistics.

Performance guarantee: demonstrating what the charging performance of an already operating system will be without needing to resort to real operation statistics for long periods of time and wide sampling universes given possible payment claims or defaults in payment.

The described method can be made particular to the case of a road charging system applied to a highway, street or road in general. It is also applicable in this particular case to road charging for a highway in which the amount to be charged depends on the distance traveled. In this case the system detection and charging modules take into account that the vehicle cannot occupy any position within the boundary of the region, but it must be on the road that it contains. Each highway section is characterized by a length and a distance between the edge of the infrastructure on which the vehicle is traveling (for example, shoulder edge) and the boundary.

On the other hand, the method of analysis for this scenario allows a mathematic calculation for the most unfavorable cases identified as:

the worst case scenario from the charging availability point of view corresponds to the vehicle traveling on the outer edge of the highway;

the worst case scenario from the probability of mischarging point of view corresponds to a permanent vehicle (during the considered charging period) located at a point immediately outside the boundary.

The analysis is greatly simplified with these conditions and both parameters (charging availability and probability of mischarging) for a given satellite visibility scenario and for predefined receiver performance are a direct function of the length of the section and the distance between the highway and the protective barrier.

BRIEF DESCRIPTION OF THE DRAWINGS

A series of drawings that aid in better understanding the invention and which are expressly related to embodiments of said invention, presented by way of illustrative and non-limiting examples thereof, are briefly described below.

DETAILED DESCRIPTION OF A PREFERRED EMBODIMENT OF THE INVENTION

Prior Definitions

Figure 1:
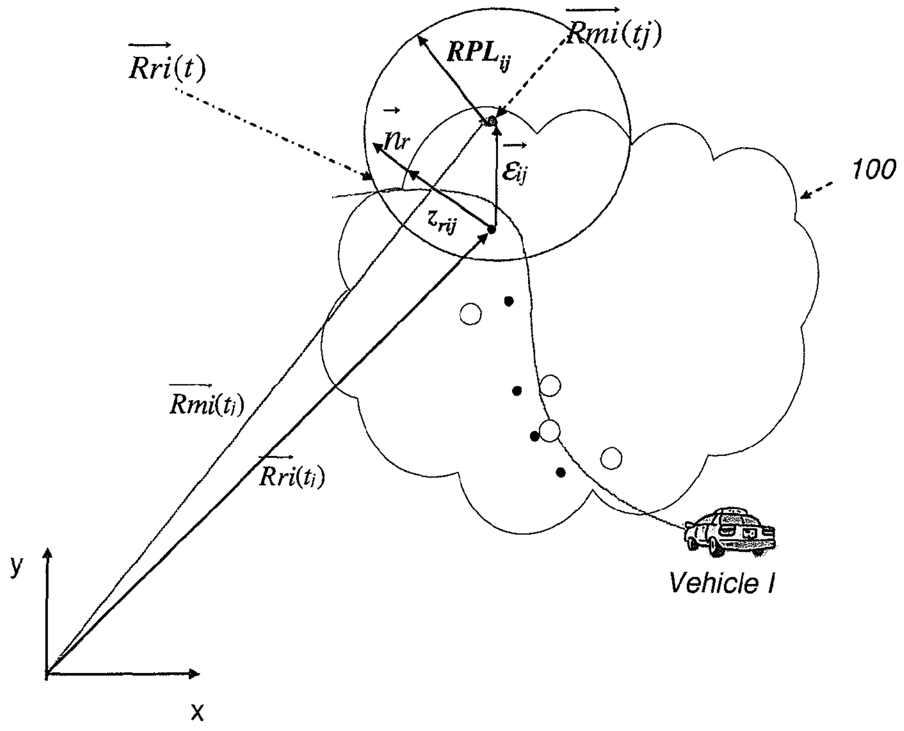
FIG. 1 shows a generic perimetral road charging scenario, identifying the names and main terms used in the description of the invention in order to understand said invention and the terms and definitions used.

A series of terms are used throughout the present invention which shall be defined below for the purpose of clarifying understanding of this invention:

Charging availability: Probability that a vehicle that has actually used the infrastructure within the charging period is detected by the system and, therefore, charged.

Probability of mischarging: Probability that a vehicle carrying the onboard receiver or OBU that has not used the infrastructure, or as the case may be, the road section being considered, during the charging period is wrongfully detected by the system and, therefore, mistakenly charged.

Onboard receiver or On-Board Unit (OBU): GNSS receiver capable of generating position data for the vehicle carrying the receiver from the reception and processing of a Global Navigation Satellite System signal of the current GPS type or of the future European Galileo system type.

Onboard receiver or OBU with integrity guarantee: GNSS receiver which, in addition to providing position information, provides additional information relating to the error that can be expected in said position and consists of:

Health flag (Healthy/Unhealthy): when the flag is healthy the position solution error in any one direction has an upper limit that is the RPL amount with a probability equal to a known value, the integrity of the position solution provided by the onboard receiver $I_{RX}$.

Radial protection level RPL, i.e. the amount delimiting the horizontal position error according to a direction with a probability equal to $I_{RX}$, i.e.:

$$P(|\vec{\epsilon}j\cdot\vec{u}|>\mathrm{RPLj})=1-I_{RX}$$

where $\vec{u}$ is any unit vector.

A particular case of implementation consists of the use of an OBU implementing the integrity assurance algorithms and methods described in European patent application EP 05076289.7.

On the other hand it can be said that a GNSS receiver does not have integrity guarantee when the health flag or the RPL do not occur or when or they do occur, but the probability that the error is not delimited by RPL is not known.

Charging period Tc: Minimum time period within which the user is charged the same amount regardless of the number of times it has used (entered-exited) the infrastructure. In the case of a perimetral toll (for example, payment for accessing the city center), the typical charging period would be one day. In other words, the user is charged a fixed amount for having entered the city center one or more times throughout the day.

Boundary 100: the closed curve on the horizontal plane defining the region the usage of which is to be charged. It is defined such that any vehicle that has been within said boundary during the charging period is subject to charge. For example, in the case of a perimetral toll, the boundary is delimited by the points of all the entrance roads to the charging area after which the user is notified that it is subject to toll. In the case of a road subject to charge (highway, expressway or street, for example) the boundary of the road section is defined by a closed curve containing the road section in question, and not including any circulation point of another road or any point of an area in which circulation or vehicle occupancy is authorized.

Road edges 200: Curves defined by the outer road shoulder edges.

Road section: a fraction of the road that can neither be entered nor exited except at the ends thereof (i.e. there are no forks or accesses) is called a road section.

$\vec{R}_{ri}(t)$: Real trajectory that a certain vehicle i has defined during the charging period Tc.

$\{\vec{R}_{mi}(t_0),\vec{R}_{mi}(t_1),\vec{R}_{mi}(t_2), \ldots, \vec{R}_{mi}(t_n)\}$: set of positions measured by the onboard receiver at the different sampling moments thereof $(t_0,t_1,t_2, \ldots)$ contained in Tc, where n is the number of position samples provided by the onboard receiver of the vehicle i during Tc. The sampling period must be equal to or greater than the decorrelation time of the position error between measurements.

Positions obtained by the onboard receiver that the receiver has decided to tag as healthy $\vec{R}_{mi}^{H}(t_j)$ are indicated with superscript H.

$\{\vec{R}_ri(t_0),\vec{R}_{ri}(t_1),\vec{R}_{ri}(t_2), \ldots, \vec{R}_{ri}(t_n)\}$: set of real positions corresponding to the different sampling moments of the receiver $(t_0,t_1,t_2, \ldots)$.

Horizontal position error vector or simply position error ($\vec{\epsilon}_{ij}$) associated to the position measurement of the onboard receiver in the vehicle i obtained at $t_j$: the difference $\vec{R}_{mi}(t_j)-\vec{R}_{ri}(tj)$.

The probability that the onboard receiver obtains a position tagged as healthy at a point (x,y) for a sampling moment $t_j$ is called GNSS position availability ($D_{RX}$).

The RPL that the onboard receiver of vehicle i provides at a moment $t_j$ is called $RPL_{ij}$.

If the vehicle enters one or more times during Tc, there will be one or more positions of the set $\{\vec{R}_ri(t_0),\vec{R}_{ri}(t_1), \vec{R}_{ri}(t_2), \ldots, \vec{R}_{ri}(t_n)\}$ within the boundary. Said subset of positions is called $\{\vec{R}_{ri}(t^I_j)\}$, where $t^I_j|_{j=1,2 \ldots m}$ are m sampling period moments of the receiver in which the real position of the vehicle is actually within the boundary.

The distance between the point occupied by the real position of the vehicle and the boundary is called the real distance ($z_{rij}$) to the boundary for vehicle i at moment $t_j$.

The distance between the point occupied by the position of the vehicle measured by the onboard receiver and the boundary is called measured distance ($z_{mij}$) to the boundary for vehicle i at moment $t_j$.

The agreement to give the distance a positive or negative sign depending on whether or not the point is inside (+) or outside of the boundary is adopted in both cases.

GNSS position availability ($D_{RX}$) and integrity ($I_{RX}$) of the positions obtained by the onboard receiver at a point of the horizontal plane and sampling moment are called GNSS performance at said point of the horizontal plane (x,y) at a given sampling moment (t). Therefore it must be noted that the signal and reception conditions thereof (visibility and multipath) are taken into account.

I. Automatic Perimetral Road Charging System with Guaranteed Performance:

FIG. 1 shows a generic scenario of an automatic perimetral road charging system with guaranteed performance. In this case the charging criterion is defined such that the charging occurs if the vehicle has been found one or more times within a region delimited by the boundary (100) during the charging period.

Figure 2:
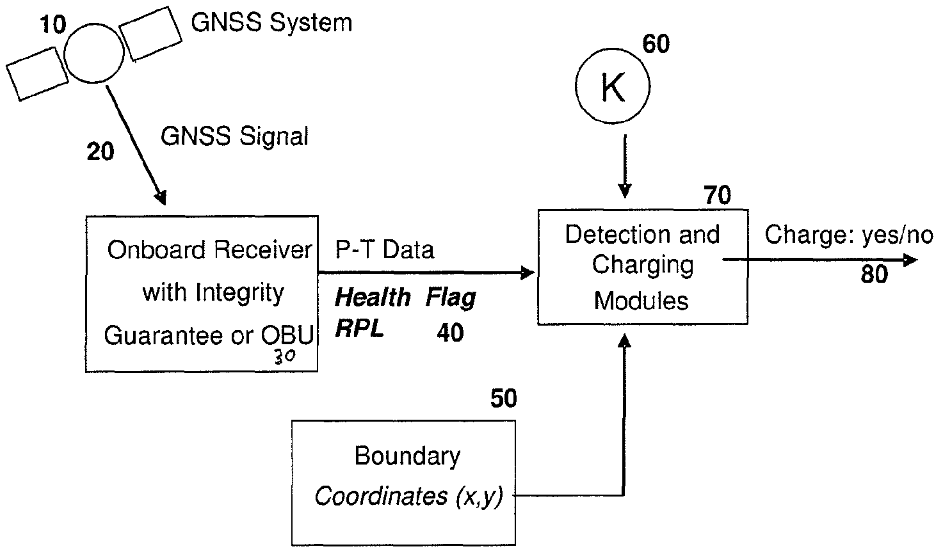
FIG. 2 shows a generic functional block diagram of the road charging system with guaranteed performance, identifying its main components and algorithms.

The automatic charging system with guaranteed performance corresponds to the functional diagram shown in FIG. 2.

The system has an onboard receiver with integrity guarantee or OBU 30 which, from the processing of the GNSS signal 20 transmitted by a GNSS system 10, tries to generate at each sampling moment a position measurement as well as a health flag and an RPL associated thereto. The detection and charging modules 70 process said data together with the coordinates defining the boundary 50 of the region for the purpose of detecting if the vehicle has been within the region one or more times and to accordingly decide to charge the vehicle or not.

Therefore the detection module 70 determines whether or not a vehicle i has used the infrastructure from the following data:

Output of the onboard receiver with integrity guarantee or OBU ($R_{mi}^{H}(t_j)$ and $RPL_{ij}$,) during the n samples taken during the charging period Tc.

Boundary coordinates of the infrastructure to be charged.

The detection module applies two different test levels: on one hand it determines whether or not the vehicle i was within the boundary at every sampling moment (detection test); on the other hand from the number of times K that it detected that the vehicle was within the boundary, it decides if the vehicle actually used the infrastructure or not (decision on use).

[1] Decision of Vehicle i Within the Boundary at a Given Sampling Moment (Detection Test):

In order to decide whether or not the vehicle was within the boundary at a given sampling moment in which a healthy position was obtained, the detection module checks that the circle of radius RPL centered on the healthy position is within the boundary. That is, it checks that the distance to the boundary is positive and greater than RPL:

Zmij>RPLij ?

[2] Decision of Whether or Not the Vehicle Actually Used the Infrastructure (Decision On Use):

The detection module considers that the previous condition must be met at least in K healthy positions of the set of samples obtained during Tc so as to decide that the vehicle did actually use the infrastructure:

Are there K or more positions in which the Detection Test is verified?

The charging system performance, i.e. charging availability and probability of mischarging, can be determined according to the GNSS performance by means of applying the previously mentioned Detection Test and Decision On Use test to the samples provided by an OBU with integrity guarantee as indicated below.

A. Charging Availability of the Automatic Perimetral Road Charging System:

The charging availability is equal to the probability $Pd_i$ that the detection module decides to charge a vehicle i that has actually entered the region delimited by the boundary. This shall in turn be equal to the probability of having K or more points complying with the Detection Test:

$$Pd_i = Pd_i(k=K) + Pd_i(k=K+1) + \ldots + Pd_i(k=m)$$

wherein K is the number of points the detection module requires and m is the number of independent position samples generated by the onboard receiver while the vehicle was actually within the boundary.

And $Pd_i(k=l)$ is the probability that l points pass the Detection Test. $Pd_i(k=l)$ can be expressed as:

$$\begin{aligned} Pd_i(k=l) = {} & p_1 \cdot p_2 \cdot p_3 \cdot \ldots \\ & p_l \cdot (1-p_{l+1}) \cdot (1-p_{l+2}) . \cdot \ldots \cdot (1-p_m) + + p_1 \cdot (1-p_2) \cdot p_3 \cdot \ldots \\ & p_l \cdot p_{l+1} \cdot (1-p_{l+2}) . \cdot \ldots \cdot (1-p_m) + + p_1 \cdot (1-p_2) \cdot (1-p_3) \cdot p_4 \cdot \ldots \\ & p_l \cdot p_{l+1} \cdot p_{l+2} . \cdot (1-p_{l+2}) \ldots \cdot (1-p_m) + + \ldots + \\ & p_1 \cdot (1-p_2) \cdot (1-p_3) \cdot \ldots \cdot (1-p_{m-l}) \cdot p_{m-l+1} \cdot p_{m-1+2} . \cdot \ldots \cdot p_m + + \\ & (1-p_1) \cdot p_2 \cdot p_3 \cdot \ldots p_{l+1} \cdot (1-p_{l+2}) \cdot (1-p_{l+3}) . \cdot \ldots \cdot (1-p_m) + + \\ & (1-p_1) \cdot p_2 \cdot (1-p_3) \cdot p_4 \ldots \cdot p_{l+2} \cdot (1-p_{l+3}) . \cdot \ldots \cdot (1-p_m) + + \ldots + \\ & (1-p_1) \cdot p_2 \cdot (1-p_3) \cdot \ldots \cdot (1-p_{m-l}) \cdot p_{m-l+1} \cdot p_{m-l+2} . \cdot \ldots \cdot p_m + \\ & \ldots + (1-p_1) \cdot (1-p_2) \cdot (1-p_3) \cdot \ldots \cdot \\ & (1-p_{m-l-1}) \cdot p_{m-l} \cdot p_{m-l+1} \cdot p_{m-l+2} . \cdot \ldots \cdot p_m \end{aligned}$$

wherein $p_j$ is the probability that at moment $t'_j$; (in which the real position $\vec{Rr}_i(t^I_j)$ of the vehicle i was within the boundary) the position measured by the receiver $\vec{R}_{mi}(t^I_j)$ is available and that it is tagged as healthy by the receiver and that a circle of radius RPLij centered thereon is contained within the boundary.

Probability $p_j$ can be broken down into two terms according to the following expression:

$$p_j = D_{Rxj} \cdot r_j$$

wherein:

$D_{Rxj} = D_{Rx}(\vec{Rr}_i(t^I_j), t^I_j)$ is the probability that an onboard receiver located in position $\vec{Rr}_i$ occupied by the vehicle at sampling moment $t^I_j$ with the GNSS conditions in that moment of the day obtains a position tagged as healthy. That is, it is the GNSS position availability ($D_{RX}$) at a given point and moment as it was hereinbefore defined.

$r_j = r_j(z_{rj})$: is the probability that a circle of radius $RPL_{ij}$ centered on $R_{mi}^{H}(t_j)$ complies with the conditions of the Detection Test.

This probability is a function of the real distance to the boundary ($z_{rj}$) according to the following expression:

$$r_j = P(\vec{\epsilon j} \cdot n_{rj} < z_{ri} - RPL_j) \text{ where } z_{rj} > 0.$$

Probability $r_j$ allows certain analytical processing due to the fact that when the position is tagged as healthy (as is the case here), the position error behaves such that it is known that it is delimited by $RPL_j$ with a confidence level of $I_{RX}$. That is, if the onboard receiver has integrity guarantee, it is known that:

$$P(|\vec{\epsilon j}\cdot\vec{n_{rj}}|>RPLj)=1-I_{RX}$$

Note that typically $1-I_{RX}<<1$.

According to this expression, it is found that $r_j$ adopts the following values according to the distance to the boundary For distances from the boundary ranging from 0 to 2RPL, $r_j$ significantly ranges from a very small value at 0 and equal to $(1-I_{RX})$, up to a large value close to 1 and equal to $I_{RX}$ at 2RPL:

For $0<z_{rj}<2RPL$:

$$r_j=P(\vec{\epsilon j}\cdot\vec{nrj}<-RPL_j)=1-I_{Rx}\ (\text{in } z_{rj}=0)$$

$$r_j=P(\vec{\epsilon j}\cdot\vec{nrj}<RPL)=I_{Rx}(\text{in } z_{rj}=2RPL)$$

In this case and given that the position error is maintained within the interval defined by RPL, it can be conservatively assumed that error projection according to the normal behaves such that it is always delimited by a Gaussian distribution with standard deviation equal to RPL/F, wherein F is the so-called protection factor associated to $I_{Rx}$ (F is defined according to the following expression: $P(x\in N(0,1)>F)=1-I_{Rx}$).

According to this new conservative approximation:

For $0<z_{rj}<2\cdot RPLj$:

$$r_j \geq P\left(\vec{\varepsilon j}\cdot\vec{n_{rj}} < z_{rj} - RPL_j\right) = P\left(F\cdot\frac{\vec{\varepsilon j}\cdot\vec{n_{rj}}}{RPLj} < F\cdot\left(\frac{z_{rj}}{RPLj}-1\right)\right)$$

$$r_j \geq P\left(x\in N(0,1) < F\cdot\left(\frac{z_{rj}}{RPLj}-1\right)\right)$$

For distances to the boundary greater than 2RPL, $r_j$ is close to 1 (greater than $I_{Rx}$):

For $2RPL<z_{rj}$ $$r_j=P(\vec{\epsilon j}\cdot\vec{nrj}<RPL)\geqq I_{Rx}$$

B. Probability of Mischarging of the Automatic Perimetral Road Charging System:

If the vehicle i does not use the infrastructure at any time of the charging period Tc, according to the probability of mischarging $Pmd_i$, the latter will be equal to the probability that the system detection module detects that the vehicle i has crossed the boundary K or more times over that charging period Tc; i.e. if there are K or more position samples measured by the onboard receiver during the charging period Tc in which the circle of radius $RPL_{ij}$ centered on $\vec{R_{mi}^H}(t_j)$ is within the boundary. $Pmd_i$ is equal to:

$$Pmd_i=Pmd_i(k=K)+Pmd_i(k=K+1)+\ldots+Pmd_i(k=M)$$

wherein:

M is the total number of independent samples taken from the onboard receiver in vehicle i during the entire charging period; and, $Pmd_i(k=l)$ is the probability of detecting only l points out of those points that are inside the boundary, being equal to:

$$\begin{aligned}
Pmd_i(k=l)= &\\
& pm_1\cdot pm_2\cdot pm_3\cdot\ldots pm_l\cdot(1-pm_{l+1})\cdot(1-pm_{l+2}).\cdot\ldots\cdot(1-pm_M)++\\
& pm_1\cdot(1-pm_2)\cdot pm_3\cdot\ldots pm_l\cdot pm_{l+1}\cdot(1-pm_{l+2}).\cdot\ldots\cdot(1-pm_M)++\\
& pm_1\cdot(1-pm_2)\cdot(1-pm_3)\cdot pm_4\cdot\ldots\\
& pm_l\cdot pm_{l+1}\cdot pm_{l+2}.\cdot(1-pm_{l+2})\ldots\cdot(1-pm_M)++\ldots+\\
& pm_1\cdot(1-pm_2)\cdot(1-pm_3)\cdot\ldots\cdot(1-pm_{m-l})\cdot pm_{m-l+1}\cdot\\
& pm_{m-1+2}.\cdot\ldots\cdot pm_M++(1-pm_1)\cdot pm_2\cdot pm_3\cdot\ldots\\
& pm_{l+1}\cdot(1-pm_{l+2})\cdot(1-pm_{l+3}).\cdot\ldots\cdot(1-pm_M)++\\
& (1-pm_1)\cdot pm_2\cdot(1-pm_3)\cdot pm_4\\
& \ldots\cdot pm_{l+2}\cdot(1-pm_{l+3}).\cdot\ldots\cdot(1-pm_M)++\ldots+\\
& (1-pm_1)\cdot pm_2\cdot(1-pm_3)\cdot\ldots\cdot(1-pm_{m-l})\cdot pm_{m-l+1}\cdot\\
& pm_{m-l+2}.\cdot\ldots\cdot pm_M+\ldots+(1-pm_1)\cdot(1-pm_2)\cdot(1-pm_3)\cdot\\
& \ldots\cdot(1-pm_{m-l-1})\cdot pm_{m-l}\cdot pm_{m-l+1}\cdot pm_{m-l+2}.\cdot\ldots\cdot pm_M
\end{aligned}$$

wherein $pm_j$ is the probability of erroneous detection at moment $t'_j$ (in which the real position $\vec{Rr_i}(t^I_j)$ of the vehicle i was outside the boundary), i.e. the probability that the position measured by the receiver $\vec{R_{mi}}(t^I_j)$ exists, that it is tagged as healthy and that a circle of radius RPLij centered thereon is within the boundary.

Probability $pm_j$ can be broken down into two terms according to the following expression:

$$p_j=D_{Rxj}\cdot r_j$$

wherein:

$D_{Rxj}=D_{Rx}(\vec{Rr_i}(t^I_j),t^I_j)$: is the GNSS position availability $(D_{RX})$ at a given point and moment, as it was hereinbefore defined.

The conservative simplification that $D_{RX}$ is 1 can be assumed for the purpose of charging availability analysis.

$r_j=r_j(z_{rj})$: is the probability that a circle of radius $RPL_{ij}$ centered on $\vec{R_{mi}^H}(t_j)$ (the valid position obtained by the onboard receiver located in position $\vec{Rr_i}$ occupied by the vehicle i at moment $t^I_j$ outside the boundary) complies with the conditions of the Detection Test.

This probability is a function of the real distance to $(z_{rj})$ according to the following expression (identical to the one obtained previously but for a negative z, as it is the probability of detection applied to points outside the region):

$$r_j=P(\vec{\epsilon j}\cdot\vec{n_{rj}}<z_{rj}-RPL_j)\ (\text{with } z_{rj}<0)$$

As was previously seen, probability $r_j$ allows certain analytical processing due to the fact that when the position is tagged as healthy (as is the case here), the position error behaves such that:

$$P(|\vec{\epsilon j}\cdot\vec{n_{rj}}|>RPLj)=1-I_{RX}$$

According to this expression it is found that $r_j$ is generally very small and less than $1-I_{RX}$, so for $z_{rj}<0$:

$$r_j=P(\vec{\epsilon j}\cdot\vec{nrj}<z_{rj}-RPL_j)\leqq P(\vec{\epsilon j}\cdot\vec{nrj}<-RPL_j)$$

$$r_j\leqq P(|\vec{\epsilon j}\cdot\vec{n_{rj}}|>RPLj)=1-I_{RX}$$

The probability of mischarging when a vehicle is outside the region and regardless of how far outside the region it is located, it is delimited at the upper limit if the receiver has integrity guarantee and furthermore this upper limit is $1-I_{RX}$. In other words, it is possible to guarantee performance in the probability of mischarging due to the use of an onboard receiver with integrity guarantee.

For the purpose of calculating the probability of mischarging, the conservative approximation that the availability of positions outside the boundary is 1 and that r is equal to $1-I_{RX}$ can be assumed. In this case, the probability of mischarging at any outside point is equal to $1-I_{RX}$.

According to this conservative simplification, the general expression of the probability of mischarging can be calculated as a binomial as follows:

$$Pmd_i \leq \sum_{k=K}^{M} \binom{M}{k} (1-I_{Rx})^k \cdot (I_{Rx})^{M-k}$$

Figure 3:
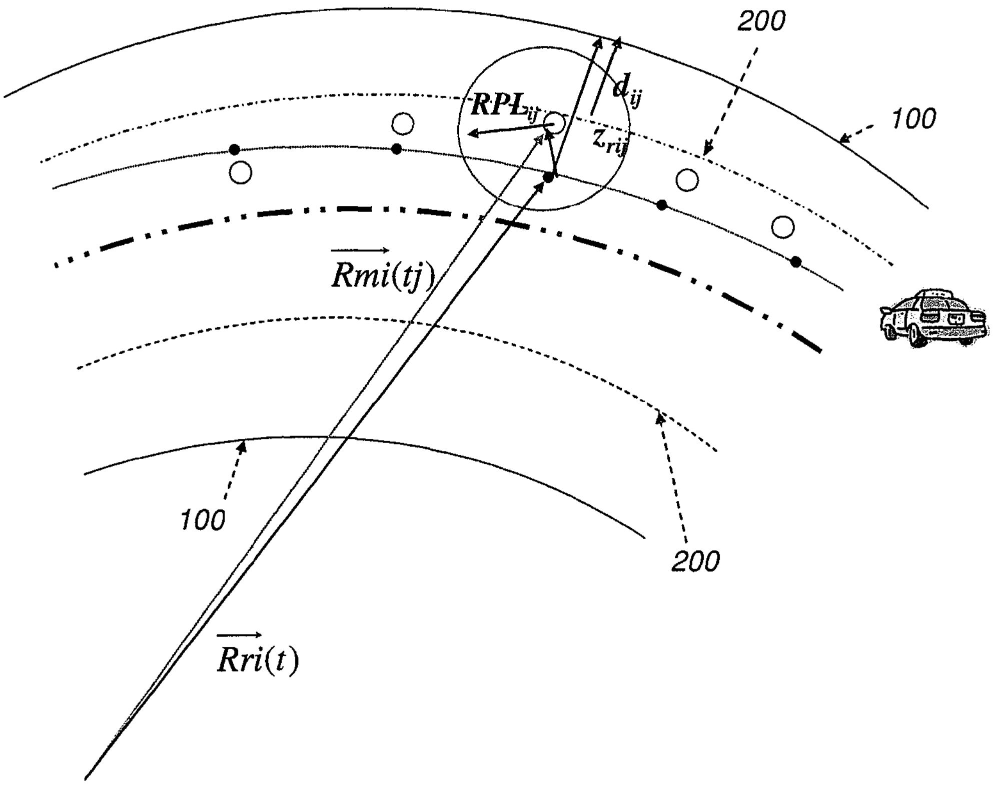
FIG. 3 is similar to FIG. 1, but for the case of road charging applied to a road.

II. Automatic Road Charging System with Guaranteed Performance of a Road:

This case is shown in FIG. 3. In this case, the charging criterion is defined such that charging occurs if the vehicle has used the road in question one or more times within the charging period.

In a more general case, the charging criterion may depend on the distance that the vehicle has traveled on the road. This case is reduced to the latter by fragmenting the entire road into sections of known length with no entrances or exits other than those belonging to the road. Each section is treated in the same way as proposed below.

Figure 4:
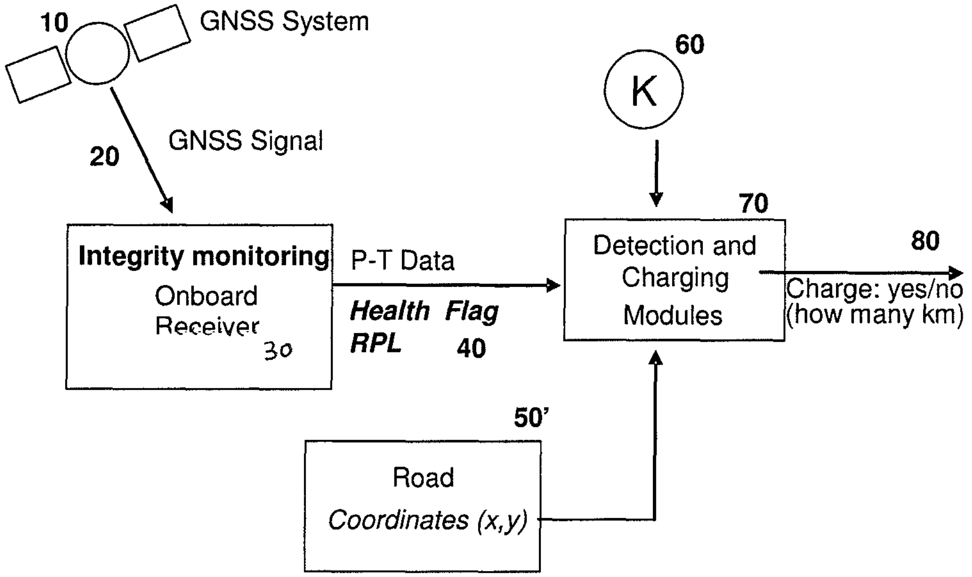
FIG. 4 shows a block diagram of the road charging system with guaranteed performance for the case of a road.

The automatic charging system with guaranteed performance corresponds to the functional diagram shown in FIG. 4.

In this case the system has an onboard receiver with integrity guarantee or OBU 30 which, from processing of the GNSS signal 20 transmitted by a GNSS system 10, tries to generate a measured position at each sampling moment as well as a health flag and RPL associated thereto. The detection and charging modules 70 process said data together with the coordinates defining the edges of the road section 50' for the purpose of detecting if the vehicle has been located on it one or more times and to accordingly decide to charge the vehicle or not.

Therefore, the detection module 70 determines whether or not a vehicle i has used said road section from the following data:

- Output of the onboard receiver with integrity guarantee or OBU ($\overrightarrow{R_{mi}}^H(t_j)$ and $RPL_{ij}$) during the n samples taken during the charging period Tc.
- Coordinates of the edge of the road section to be charged.

The detection module applies two different test levels: on one hand it determines whether or not the vehicle i was within the road section at each sampling moment (Detection Test); on the other hand, it decides, from the number of times K that it detected that the vehicle was within the road section, if the vehicle actually used it or not (Decision On Use).

[1] Decision of a Vehicle in the Road Section in a Given Sampling Moment (Detection Test):

In order to decide whether or not the vehicle was within the road section at a given sampling moment in which a healthy position was obtained, the detection module checks that the circle of radius RPL centered on the healthy position is within the boundary of the section. That is, it checks that the distance to the boundary of the section is positive and greater than RPL:

Zmij>RPLij?

wherein the boundary of the road section is defined by a closed curve containing the road section in question, and does not include any point of circulation of another road or any or any other point of an area in which circulation or vehicle occupancy is authorized.

As explained, and forming part of the method of analysis of the present invention, for a given road charging scenario, when defining the boundary, such boundary can be selected such that it improves the road charging system performance in the desired direction. If it is a road that has no other contiguous road subject to road charging, the most ample boundary compatible with the previously established conditions is selected. If there are other contiguous roads that are also subject to charging, the optimal solution must be analyzed using the method of analysis described below.

[2] Deciding Whether or Not the Vehicle Actually Used the Road (Decision On Use):

The detection module considers that the previous condition must be met at least in K healthy positions of the set of samples obtained during Tc so as to decide that the vehicle did actually use the road:

- Are there K or more positions in which the detection test is verified?

The charging system performance, i.e. charging availability and probability of mischarging, can be determined according to GNSS performance by means of applying the previously mentioned Detection Test and Decision On Use test to the samples provided by an OBU with integrity guarantee as indicated below.

A. Charging Availability of the Automatic Road Charging System of a Road:

When calculating the charging availability of a vehicle i the trajectory of which has actually covered the road in question, it is possible to restrict the possible universe of trajectories to a conservative worst case consisting in that the vehicle circulates on the edge of the road closest to the boundary and that it is located a distance $d_j$ therefrom.

If this condition is introduced in the calculation for the probability r of passing the Detection Test, the following results:

$$r_j = P(\vec{\epsilon j} \cdot \vec{n}_{rj} < z_{rj} - RPL_j) \text{ where } z_{rj} \geqq d_j.$$

As $d_j$ is generally greater than or equal to zero:

$$r_j \geqq P(\vec{\epsilon j} \cdot \vec{n}_{rj} < d_j - RPL_j)$$

This expression can be analyzed according to the value of $d_j$ and RPL:

- $r_j$ will virtually be nil in highways in which $d_j=0$. In fact it will be equal to $(1-I_{RX})$:

$$r_j > P(\vec{\epsilon j} \cdot \vec{n}_{rj} < -RPL_j) = 1 - I_{Rx}$$

- In highways in which $dj \geqq 2 \cdot RPLj$, a core will exist and r will be:

$$r_j > P(\vec{\epsilon j} \cdot \vec{n}_{rj} < RPL_j) = I_{Rx}$$

- In highways in which $0<dj<2 \cdot RPLj$, r will be delimited between $(1-I_{RX})$ and $I_{RX}$. In this case, and since the position error is maintained within the interval defined by RPL, it can conservatively be assumed that the error projection according to the normal behaves such that it is always delimited by a Gaussian distribution with standard deviation equal to RPL/F, wherein F is the so-called protection factor associated to $I_{RX}$ (F is defined according to the expression: $P(x \in N(0,1) > F) = 1 - I_{Rx}$)

According to this new conservative approximation:

For 0<dj<2 RPLj:

$$r_j \geq P(\vec{\varepsilon j} \cdot \vec{n_{rj}} < d_j - RPL_j) = P\left(F \cdot \frac{\vec{\varepsilon j} \cdot \vec{n_{rj}}}{RPLj} < F \cdot \left(\frac{dj}{RPLj} - 1\right)\right)$$

$$r_j \geq P\left(x \in N(0, 1) < F \cdot \left(\frac{dj}{RPLj} - 1\right)\right)$$

For a highway with a constant distance from the edge to the boundary ($d_j$=const.=d), $r_j$ is also constant throughout the trajectory of the vehicle. If it is also considered that GNSS availability $D_{RX}$ throughout the same is also constant, the charging availability expression for a vehicle i takes on the following form:

$$Pd_i \geq \left[\sum_{k=K}^{m} \binom{m}{k} (D_{RX} \cdot r)^k \cdot (1 - D_{RX} \cdot r)^{m-k}\right]$$

with $$r = 1 - I_{Rx};\ (d = 0)$$

$$r = P\left(N(0, 1) < F \cdot \left(\frac{d}{RPL} - 1\right)\right);\ (0 < d < 2RPL)$$

$$r = I_{Rx};\ (d \geq 2RPL)$$

This expression of $P_d$ allows determining the charging availability for any vehicle according to K, m, d/RPL, $D_{RX}$ and $I_{RX}$ (note that F depends only on $I_{RX}$).

B. Probability of Mischarging of the Automatic Road Charging System of a Road:

If the vehicle i does not use the road section at any time during the charging period Tc, according to the definition of probability of mischarging $Pmd_i$, this will be equal to the probability that the system detection module will detect that the vehicle i has entered within the boundary K or more times during that charging period Tc, i.e. if there are K or more samples of positions measured by the onboard receiver during the charging period Tc in which the circle of radius $RPL_{ij}$ centered on $\vec{R}_{mi}^{H}(t_j)$ is within the boundary. According to this, the general previous expression is still valid:

$$Pmd_i \leq \sum_{k=K}^{M} \binom{M}{k} (1 - I_{Rx})^k \cdot (I_{Rx})^{M-k}$$

Note that with the definition that has been used for a road boundary, the probability that a vehicle passes the two detection module tests on a road and the closest one to it is also equal to or less than the previous expression.

III. Method of Analysis of a Road Charging System Performance

The invention also relates to a method of analysis and design which allows relating the road charging system performance with the scenario data involved and the receiver performance.

That is, different types of analysis associated to the road charging system can be conducted:

- Designing the road charging system: suitably adjusting or selecting the different parameters defining it (geometry of the infrastructure object of charge) such that certain charging availability and probability of mischarging performance defined by the infrastructure provider (a city council, a highway concessionaire, the State, etc.) are guaranteed.
- Analyzing the features of a road charging system given a series of system parameters:
  - anticipating what the charging features of the system will be before it begins operating and, therefore, seeing whether or not the established requirements will be met without needing to perform costly tests to accumulate statistics.
  - anticipating what the charging features of an already operating system will be without needing to resort to real operation statistics for long periods of time and wide sampling universes given possible payment claims or defaults in payment.

The analysis and design tool of the invention is based on the following components and algorithms:

- A man-machine interface that allows introducing the different parameters affecting system performance, such as the number of vehicles, acceptable probability of mischarging, observation period, etc.
- Simulator of the different GNSS systems, particularly satellite movement.
- A GIS-type tool that allows configuring the boundaries for each region, road or road section.
- A 3D description of the roads, cities and their surroundings.
- A satellite visibility analysis tool for different positions of the user which, given its position, the geometry of the surroundings and the simulated satellite position, allows identifying visible satellites.
- A characterization of the user's receiver performance (sizes of RPLs, $I_{RX}$ and health flag) according to the number of satellites in view and other features thereof with a model based on the algorithms identified in European patent application EP 05076289.
- A traffic model providing expected trajectories and their frequency of occurrence.
- A calculation process as indicated in the following sections IV and V, according to whether the analysis and design is for a perimetral road charging system or for road usage, respectively.

IV. Method of Analysis of Perimetral Road Charging System Performance

For an automatic perimetral charging system such as the one hereinbefore described, it is possible to determine, and therefore analyze, the performance thereof from the contour conditions and GNSS performance by means of the method proposed below.

Figure 5:
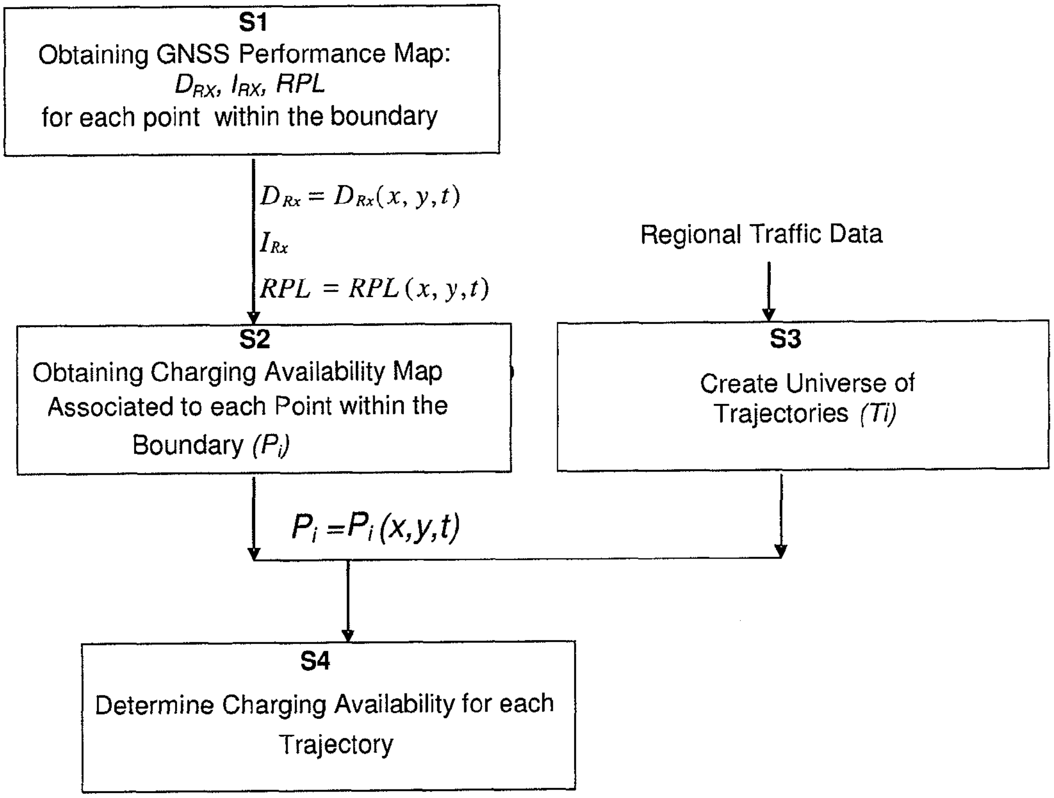
FIG. 5 shows the generic functional block diagram of the method of performance analysis for the guaranteed performance road charging system for a perimetral charging system, identifying the main steps and algorithms.

FIG. 5 shows a block diagram of the main steps of said method.

According to the obtained formulation, the proposed method for calculating the charging availability for a given scenario, i.e. for a boundary and determined value of K, is as follows:

S1. Obtaining the GNSS performance map ($D_{RX}$ and RPL): the probability of having a position tagged as healthy by the receiver ($D_{Rx}=D_{Rx}(\overrightarrow{Rr_i}(t^I_j),t^I_j)$ as well as the expected RPL values associated to its position measurements for a certain given value of integrity $I_{RX}$ is determined for each point within the region and for each possible sampling moment according to the GNSS receiver performance and GNSS visibility conditions.

S2. Obtaining the charging availability map associated to each point and sampling moment ($p_j$), defined as the probability that when a vehicle passes through said point at that moment it generates a healthy position sample complying with the Detection Test. The probability of detection for each point within the region and sampling moment is calculated on the same $p_j$ using for that purpose the previous map together with the expression of r on each point within the region described hereinbefore:

$$p_j = D_{Rxj} \cdot r_j$$

wherein:

$D_{Rxj}=D_{Rx}(\overrightarrow{Rr_i}(t^I_j),t^I_j)$: This is GNSS position availability ($D_{RX}$) at a given point and moment as it was obtained in the previous step; and $r_j=r_j(z_{rj})$: This is the probability that a circle of radius RPLij centered on $\overrightarrow{R}_{mi}{}^{H}(t_j)$ complies with the conditions of the Detection Test. This probability is a function of the real distance to the boundary ($z_{rj}$) according to the following expression:

$$r_j = P(\vec{\epsilon j} \cdot \vec{n}_{rj} < z_{rj} - RPL_j) \text{ where } z_{rj} > 0,$$

wherein $r_j$ is calculated for each point at a distance from boundary $z_{rj}$ by means of:

For $0 \leqq z_{rj} \leqq 2RPL$:

$$r_j = P(\vec{\epsilon} \cdot \vec{nrj} < -RPL_j) = 1 - I_{Rx} \text{ (in } z_{rj}=0)$$

$$r_j = P(\vec{\epsilon} \cdot \vec{nrj} < RPL) = I_{Rx} \text{ (in } z_{rj}=2RPL)$$

and in the points within the region:

$$r_j \geq P\left(x \in N(0, 1) < F \cdot \left(\frac{z_{rj}}{RPLj} - 1\right)\right)$$

with F defined such that $P(x \in N(0,1) > F) = 1 - IRx$

For distances to the boundary exceeding 2RPL, $r_j$ is close to 1 (greater than $I_{RX}$):

For $2RPL < z_{rj}$ $$r_j = P(\vec{\epsilon j} \cdot \vec{nrj} < RPL) \geqq I_{Rx}$$

S3. Creating the Universe of Trajectories: Creating the universe of possible trajectories ($Tr_i$) according to the available data on real traffic in the area. Each trajectory is defined by the sequence of horizontal position vectors that the vehicle defines on said trajectory and by the frequency of occurrence data thereof ($fr_i$).

S4. Determining the charging availability for each trajectory ($Pd_i$): the charging availability ($Pd_i$) is determined for each trajectory $Tr_i$ by means of the following expression:

$$\begin{aligned} Pd_i(k=l) = \; & p_1 \cdot p_2 \cdot p_3 \cdot \ldots p_l \cdot (1-p_{l+1}) \cdot (1-p_{l+2}) \cdot \cdot \ldots \cdot (1-p_m) ++ \\ & p_1 \cdot (1-p_2) \cdot p_3 \cdot \ldots p_l \cdot p_{l+1} \cdot (1-p_{l+2}) \cdot \cdot \ldots \cdot (1-p_m) ++ \\ & p_1 \cdot (1-p_2) \cdot (1-p_3) \cdot p_4 \cdot \ldots \\ & p_l \cdot p_{l+1} \cdot p_{l+2} \cdot \cdot (1-p_{l+2}) \ldots \cdot (1-p_m) ++ \ldots + \\ & p_1 \cdot (1-p_2) \cdot (1-p_3) \cdot \ldots \cdot (1-p_{m-l}) \cdot p_{m-l+1} \cdot p_{m-1+2} \cdot \cdot \\ & \ldots \cdot p_m ++ (1-p_1) \cdot p_2 \cdot p_3 \cdot \ldots p_{l+1} \cdot (1-p_{l+2}) \cdot \\ & (1-p_{l+3}) \cdot \cdot \ldots \cdot (1-p_m) ++ (1-p_1) \cdot p_2 \cdot (1-p_3) \cdot p_4 \\ & \ldots \cdot p_{l+2} \cdot (1-p_{l+3}) \cdot \cdot \ldots \cdot (1-p_m) ++ \ldots + \\ & (1-p_1) \cdot p_2 \cdot (1-p_3) \cdot \ldots \cdot (1-p_{m-l}) \cdot p_{m-l+1} \cdot p_{m-l+2} \cdot \cdot \ldots \cdot p_m + \\ & \ldots + (1-p_1) \cdot (1-p_2) \cdot (1-p_3) \cdot \ldots \cdot \\ & (1-p_{m-l-1}) \cdot p_{m-l} \cdot p_{m-l+1} \cdot p_{m-l+2} \cdot \cdot \ldots \cdot p_m \end{aligned}$$

wherein $P_j$ is taken at each point j of the trajectory i of the map obtained in step 2.

5. Determining the average charging availability. The average charging availability is obtained from Pdi and the frequency of occurrence of each trajectory $fr_i$ as:

$$\text{Charging availability(average)} = \Sigma Pd_i \cdot fr_i$$

6. Determining the probability of mischarging as:

$$Pmd_i = \sum_{k=K}^{M} \binom{M}{k} (1 - I_{Rx})^k \cdot (I_{Rx})^{M-k}$$

wherein M is the total samples that can be generated by the onboard receiver during the entire charging period.

7. Checking if the road charging system performance is compatible with the existing requirements. If this is not the case, checking if it is possible to comply with said requirements by modifying K.

Note that increasing the value of K for the same value of $I_{RX}$ allows reducing the probability of mischarging at the expense of decreasing the charging availability. On the other hand, decreasing K improves the charging availability at the expense of worsening the probability of mischarging.

V. Method of Analysis of Road Charging System Performance for a Road

For an automatic road charging system such as the one described in the foregoing it is possible to determine, and therefore analyze, the performance thereof from the contour conditions and GNSS performance by means of the method proposed below.

In addition to the previous analysis (determining the automatic road charging system performance given certain GNSS performance and contour conditions), it is possible in this case to directly check if it is viable to simultaneously comply with the charging availability and probability of mischarging requirements by means of the method explained below:

1. The upper allowable limit of the probability of mischarging for a vehicle that does not use the road is determined from the number of vehicles that typically stay off the road (Np) and from the desired requirement on the probability of mischarging MD or more vehicles throughout the Tc (PMD) by means of the following expression:

$$PMD = \sum_{md=MD}^{NP} \binom{Np}{md} Pmd^{md} \cdot (1 - Pmd)^{Np-md}$$

2. The number of points K of the system detection module guaranteeing the required Pmd is determined with the obtained Pmd value and given certain integrity $I_{RX}$ performance of the onboard receiver by means of the following expression:

$$Pmd_i = \sum_{k=K}^{M} \binom{M}{k} (1 - I_{Rx})^k \cdot (I_{Rx})^{M-k}$$

Figure 7:
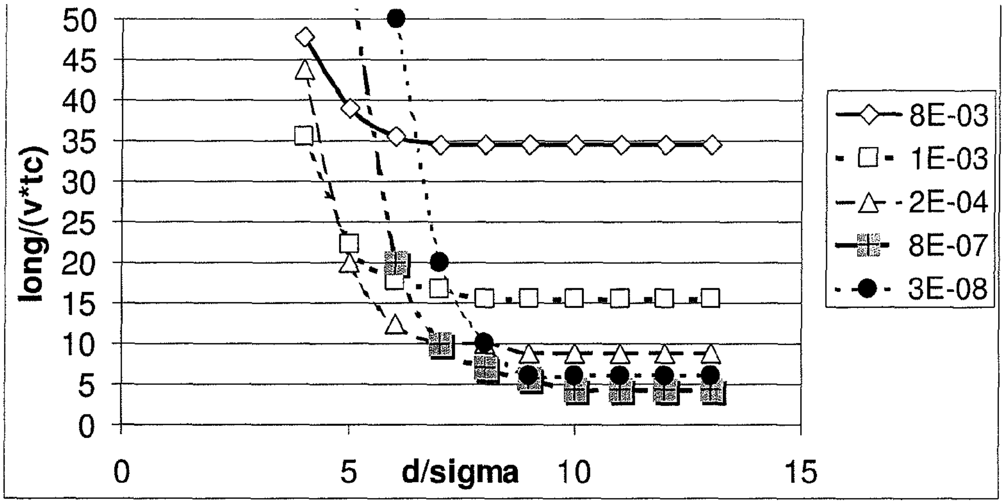
FIG. 7 shows an example of highway configuration identification (different lengths and distances to the boundary) for which it is possible to assure the charging availability and possibility of mischarging performance according to the OBU integrity level.

3. The family of curves such as those in the graph in FIG. 7 is constructed with the resulting K value, and given the $I_{RX}$ and RPL values for the onboard receiver and the given signal reception scenario, by means of the following expression of Pdi:

$$Pd_i \geq \left[ \sum_{k=K}^{m} \binom{m}{k} (D_{RX} \cdot r)^k \cdot (1 - D_{RX} \cdot r)^{m-k} \right]$$

with $$r = 1 - I_{Rx};\ (d = 0)$$

$$r = P\left(N(0, 1) < F \cdot \left(\frac{d}{RPL} - 1\right)\right);\ (0 < d < 2RPL)$$

$$r = I_{Rx};\ (d \geq 2RPL)$$

Therefore, FIG. 7 shows possible highway configurations for which it is possible to assure charging availability and possibility of mischarging performance according to the level of integrity of the OBU. This graph shows possible solutions for different values of $1-I_{RX}$, the possible solutions being those which are above each curve.

The number of points while the vehicle is found within the boundary (m) that are required to guarantee the required charging availability is obtained from said family of curves.

4. Given a length of the road section in question (L), a vehicle speed (V) and a decorrelation time between measurements ($\tau_c$), the number of available position samples $L/(V \cdot \tau_c)$ within the boundary is checked as to whether it is equal to or greater than the number of necessary samples m resulting from the previous step. Note that m is the number of points in which the vehicle is within the boundary and the onboard receiver tries to provide a position sample and, therefore, it is equal to the total time of vehicle permanence within the boundary divided by the decorrelation time between measurements. If this is not the case, it means that it is not possible to simultaneously comply with the probability of mischarging and charging availability requirements for the given scenario for any value of K.

5. If it is not possible to comply with both requirements, if it is possible to move the boundary away from the road complying with the conditions thereof, it is possible to increase the charging availability by maintaining the probability of mischarging. In fact, by choosing a valid more distant boundary (i.e. a boundary that complies with the conditioning factors hereinbefore described), the distance d from the edge of the road to the boundary is increased, which increases the value of rand therefore of Pdi.

Figure 6:
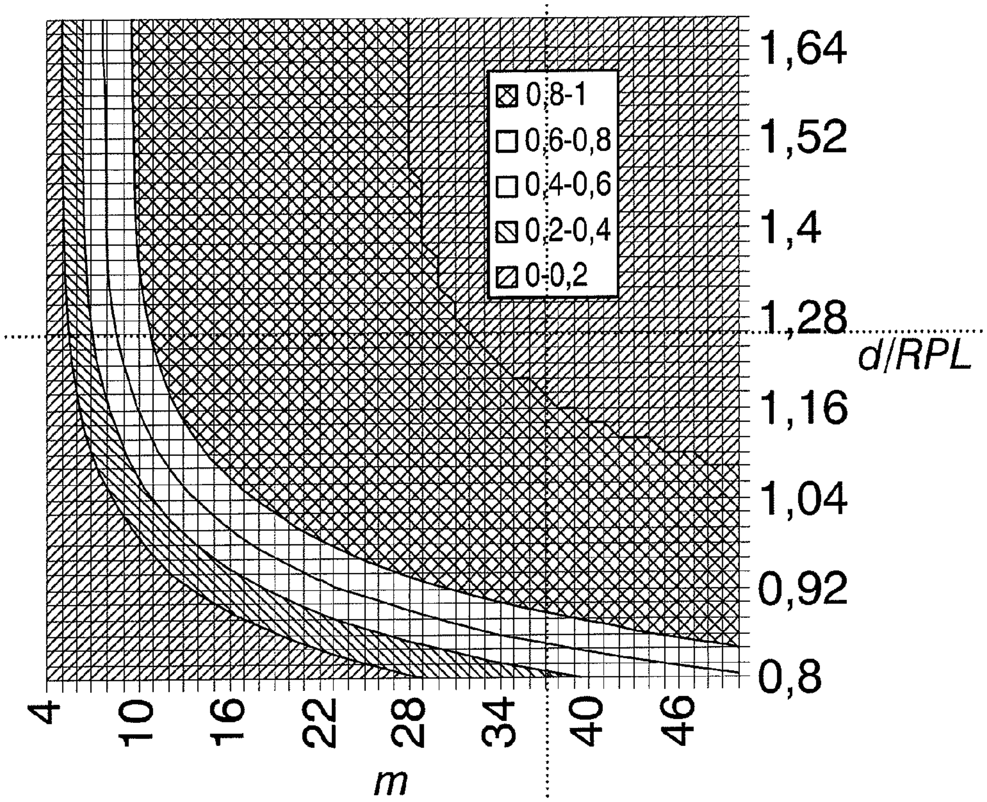
FIG. 6 shows a charging availability graph of an automatic road charging system for a road according to (m) and (d/RPL).

By way of example, FIG. 6 shows a charging availability graph for an automatic road charging system according to (m) and (d/RPL). Specifically, the charging availability is calculated for the following values: K=5, $I_{RX}$=2,8E-07 and $D_{RX}$=50%.

The invention claimed is:

1. A method implemented on a computer having a processor and a memory coupled to said processor for analysis and design of a perimetral charging system for charging a vehicle (i) for usage of an infrastructure delimited by a boundary during a charging period Tc, comprising the following steps:

obtaining a Global Navigation Satellite System (GNSS) performance map ($D_{RX}$, $I_{RX}$, RPL), determining for each point within the boundary and for each sampling moment a probability of having a position tagged as healthy by an onboard receiver ($D_{Rx}=D_{Rx}(\vec{Rr}_i(t^I_j),t^I_j)$), as well as expected Radial Protection Level (RPL) values associated with its position measurements for a certain given value of integrity $I_{RX}$, according to the performance of the GNSS onboard receiver and GNSS visibility conditions;

obtaining using said processor a charging availability map associated with each point within the boundary and sampling moment ($p_j$), calculating for each point within the boundary and sampling moment the probability that a vehicle located at said point at that moment generates a healthy position sample and is detected by a system detection module which determines that a vehicle is within the boundary at a moment when all demarcated points of a region comprised by a circle of radius RPL centered on said position are within the boundary, so that the GNSS performance map is used together with the following expression of r on each point within the boundary:

$$p_j = D_{Rxj} \cdot r_j$$

wherein:

$D_{Rxj}=D_{Rx}(\vec{Rr}_i(t^I_j),\ t^I_j)$ is the GNSS position availability ($D_{RX}$) at a given point and moment, as obtained in the previous step; and $r_j=r_j(z_{rj})$: is the probability that a circle of radius $RPL_{ij}$ centered on $\vec{R}_{mi}^H(t_j)$ is within the boundary, this being a function only of the distance from the point to the boundary ($z_{rj}$) and of the expected RPL value at the point;

creating a universe of possible trajectories ($Tr_i$) according to available real traffic data for the road, each trajectory being defined by a sequence of horizontal position vectors that the vehicle defines on said road and by the frequency of occurrence data thereof ($fr_i$);

determining using said processor the charging availability for each trajectory ($Pd_i$), determining the charging availability for each trajectory $Tr_i$ using a formulation that is a function only of the number of points K that a system charging module requires, of the charging availability at each point of the trajectory, of a decorrelation time of the error of the positions obtained by the GNSS receiver, of GNSS availability, of the length of the trajectory that is within the perimeter, and of the speed of the vehicle throughout the trajectory;

determining using said processor the average charging availability from $Pd_i$ and the frequency of occurrence of each trajectory fri as:

$$\text{Charging availability(Average)}=\Sigma Pd_i{\cdot}fr_i$$

determining the probability of mischarging as:

$$Pmd_i = \sum_{k=K}^{M} \binom{M}{k} (1 - I_{Rx})^k \cdot (I_{Rx})^{M-k}$$

wherein M is a total number of samples that can be generated by the onboard receiver during the entire charging period Tc; and checking whether the charging system performance is compatible with the existing system performance requirements, and if not, checking whether it is possible to comply with said requirements by modifying K.

2. The method of analysis and design of a perimetral charging system according to claim 1, further comprising the steps of delimiting the boundary of the perimetral charging system by the points of all entrance roads to the charging area and then notifying a user of a vehicle that the vehicle is subject to charge.

3. The method of analysis and design of a perimetral charging system according to claim 1, wherein the charging module determines that the vehicle has used the infrastructure during said charging period Tc when there is a predefined number K of positions for which the detection module has determined that the vehicle is within the boundary, such that for K positions, a region comprised by a circle of radius RPL centered on them being within the boundary during Tc is used, and wherein the value of K is chosen so as to assure that the probability of mischarging, in which the vehicle carrying the onboard receiver that has not been within the boundary during the charging period is charged, is delimited, the relationship between K and said probability of mischarging being given by the following expression:

$$Pmd_i \le \sum_{k=K}^{M} \binom{M}{k} (1 - I_{Rx})^k \cdot (I_{Rx})^{M-k}$$

wherein M is the total number of independent samples taken from the onboard receiver in the vehicle i during the entire charging period Tc.

4. The method of analysis and design of a perimetral charging system according to claim 1, wherein in order to charge, the direction of the road on which the vehicle has traveled must be determined by checking that at least two positions are available, the sequence of these positions over time defining the circulation direction, and the regions defined by a circle of radius RPL centered thereon do not intersect.

5. A method implemented on a computer having a processor and a memory coupled to said processor for analysis and design of a road charging system for charging a vehicle (i) for usage of an infrastructure delimited by a boundary during a charging period Tc, and which allows, for a given road section characterized by its geometry, particularly a length L and a distance d between an edge of the road and the boundary, and the geometry of its surroundings, analyzing system performance in terms of charging availability and probability of mischarging as a function of a number of positions K required by a charging module, said method comprising:

calculating using said processor the charging availability using a conservative approximation based on conclusions comprising (1) the vehicle is always on the road on which vehicles circulate and at the outer edge of the road, (2) the distance of the outer edge of the road to the boundary is d characteristic of the infrastructure and considered constant in the section, and (3) position errors for probabilities of an order of magnitude of the availability can be conservatively limited by a zero-mean Gaussian distribution with a standard deviation calculated as RPL/F, where RPL is a Radial Protection Level as provided by an onboard receiver, and F is a factor associated with a probability $I_{RX}$ of the Gaussian distribution, where said calculating step includes:

determining upper allowable limits of a probability (Pmd) of mischarging for a vehicle not using the road from a number (Np) of vehicles that stay off the road and from a desired requirement for the probability of mischarging of MD or more vehicles during a charging period Tc (PMD), resolving the following expression by iteration:

$$PMD = \sum_{md=MD}^{NP} \binom{Np}{md} Pmd^{md} \cdot (1 - Pmd)^{Np-md}$$

determining using said processor the number of points K guaranteeing the required Pmd of a system detection module, which determines that a vehicle is within the boundary at a moment when all demarcated points of a region comprised by a circle of radius RPL centered on said position are within the boundary, with the obtained Pmd value and a given certain value of integrity ($I_{Rx}$) performance of the onboard receiver, using the following expression:

$$Pmd_i = \sum_{k=K}^{M} \binom{M}{k} (1 - I_{Rx})^k \cdot (I_{Rx})^{M-k}$$

constructing a family of curves with the resulting K value, the integrity $I_{Rx}$ and RPL values for the onboard receiver, and a given signal reception scenario, using the following expression of Pdi:

$$Pd_i \ge \left[ \sum_{k=K}^{m} \binom{m}{k} (D_{RX} \cdot r)^k \cdot (1 - D_{RX} \cdot r)^{m-k} \right]$$

with $$r = 1 - I_{Rx};\ (d = 0)$$

$$r = P\left(N(0, 1) < F \cdot \left(\frac{d}{RPL} - 1\right)\right);\ (0 < d < 2RPL)$$

$$r = I_{Rx};\ (d \ge 2RPL)$$

obtaining a number of points m required for guaranteeing the required charging availability from said family of curves; and checking that a number of available position samples $L/(V\cdot\tau_c)$ within the boundary is equal to or greater than the number of necessary samples m resulting from the previous step given a length L of the road section, a speed V of the vehicle, and a decorrelation time between measurements $\tau_c$; and if this is not the case, concluding that it is not possible to simultaneously comply with the probability of mischarging and charging availability requirements for the given scenario for any value of K.

6. The method of analysis and design of a road charging system for roads according to claim 5, comprising applying the method to identify the road sections complying with certain specified charging availability and probability of mischarging requirements.

7. The method of analysis and design of a road charging system for roads according to claim 5, further comprising the steps of further modeling the RPL value as a known function of $I_{RX}$ according to features of the onboard receiver, and determining, for a given road section characterized by its geometry, particularly the length L and distance d between the edge of the road and the boundary, and the geometry of its surroundings, and given certain charging availability and probability of mischarging requirements, $I_{RX}$ of the receiver complying with said requirements.

8. The method of analysis and design of a road charging system for roads according to claim 5, wherein the charging module determines that the vehicle has used the infrastructure during said charging period Tc when there is a predefined number K of positions for which the detection module has determined that the vehicle is within the boundary, such that for K positions, a region comprised by a circle of radius RPL centered on them being within the boundary during Tc is used, and wherein the value of K is chosen so as to assure that the probability of mischarging, in which the vehicle carrying the onboard receiver that has not been within the boundary during the charging period is charged, is delimited, the relationship between K and said probability of mischarging being given by the following expression:

$$Pmd_i \leq \sum_{k=K}^{M} \binom{M}{k} (1 - I_{Rx})^k \cdot (I_{Rx})^{M-k}$$

wherein M is the total number of independent samples taken from the onboard receiver in the vehicle i during the entire charging period Tc.

9. The method of analysis and design of a road charging system for roads according to claim 5, wherein in order to charge, the direction of the road on which the vehicle has traveled must be determined by checking that at least two positions are available, the sequence of these positions over time defining the circulation direction, and the regions defined by a circle of radius RPL centered thereon do not intersect.

* * * * *